United States Patent
Taib et al.

(10) Patent No.: US 6,747,685 B2
(45) Date of Patent: Jun. 8, 2004

(54) CONFERENCE CALLING

(75) Inventors: Ronnie Bernard Francis Taib, Maroubra (AU); Nicolas Daniel Luc Lhuillier, Coignieres (FR); Patricia Mary Charlton, London (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/236,119

(22) Filed: Sep. 6, 2002

(65) Prior Publication Data
US 2003/0122921 A1 Jul. 3, 2003

(30) Foreign Application Priority Data
Sep. 13, 2001 (EP) .............................. 01402301

(51) Int. Cl.[7] ................................. H04N 7/14
(52) U.S. Cl. ................. 348/14.01; 348/14.08; 348/14.09
(58) Field of Search .......................... 348/14.01–14.09, 348/14.1, 14.11–14.13; H04N 7/14

(56) References Cited

FOREIGN PATENT DOCUMENTS

| EP | 1 009 148 A | 6/2000 |
|---|---|---|
| FR | 2 799 914 A | 4/2001 |
| JP | 402237358 A * | 9/1990 ............ H04N/7/14 |

OTHER PUBLICATIONS

Charlet et al. ; Telephone Conference System . . . to identify each current speaker; Apr. 19, 2001; WO 200128214A1.*

* cited by examiner

Primary Examiner—Melur Ramakrishnaiah

(57) ABSTRACT

A method of conducting a conference call, comprising: identifying a user (2) of a first communication unit (12) speaking during the conference call; transmitting data related to the identified speaker (2) to other communication units (14, 16, 28) being used by other users (4, 6, 8) participating in the conference call; the communication units (14, 16, 18) receiving the data related to the identified speaker (2) and displaying speaker data based on the received data related to the identified speaker (2). The speaker (2) may be identified by comparing the speech being spoken by the user with a voice profile for that user. Also described is a corresponding communication system, a caller identification module (21), and adapted communication units (12, 14, 16, 18).

13 Claims, 2 Drawing Sheets

CONFERENCE CALLING

FIELD OF THE INVENTION

This invention relates to the implementation of conference calls in communication systems.

BACKGROUND OF THE INVENTION

Telecommunication systems are conventionally able to set up and conduct conference calls, i.e. calls in which users of more than two communication units, such as telephones, mobile telephones, computers, participate in a call.

It is known to identify the caller at the beginning of a telephone call by displaying the caller's telephone number and then possibly displaying information about the caller. U.S. Pat. No. 6,020,916 describes a kind of videoconference, which displays pictures of all participants in addition to their voice. WO-0105136 enables personal data (credit-card number, social security number, etc) to be sent to the other party during a phone call. WO-0075801 sends customised advertisements along with conversation data. WO-0103406 allows a picture of the caller to be sent at the beginning of a call.

However, these known forms of identification, developed for simple one-to-one calls, do not alleviate a disadvantage that arises with conference calls, as follows. A disadvantage with conventional arrangements for conference calls involving several speakers is that the conversation quickly becomes anonymous, since there are difficulties in identifying who is currently speaking. Most of the time speakers have to identify themselves each time they take the floor. This quickly becomes tedious. Furthermore, when a speaker forgets to identify himself/herself, it becomes difficult to know from whom the last ideas emanated.

In WO0105136, data and voice cannot be sent simultaneously—there is a manual switch between them.

Presentation of the caller phone number, WO-0075801, U.S. Pat. No. 6,020,916 and WO-0103406 do not help to track the caller in real-time during the conference call. More specifically, WO-0075801 uses the speaker profile to send him advertisements, not to spread it to the other users.

Thus, there exists a need in the field of the present invention to provide an improved way of conducting conference calls such that the abovementioned disadvantages may be alleviated.

STATEMENT OF INVENTION

In a first aspect, the present invention provides a method of conducting a conference call, as claimed in claim 1.

In a second aspect, the present invention provides a communication system for carrying out a conference call, as claimed in claim 11.

In a third aspect, the present invention provides apparatus for conducting a conference call.

In a fourth aspect, the present invention provides a communication unit for participating in a conference call.

In a fifth aspect, the present invention provides a storage medium.

Further aspects are as claimed in the dependent claims.

BRIEF DESCRIPTION OF THE DRAWINGS

Exemplary embodiments of the present invention will now be described, with reference to the accompanying drawings, in which.

DESCRIPTION OF PREFERRED EMBODIMENTS

Figure 1:
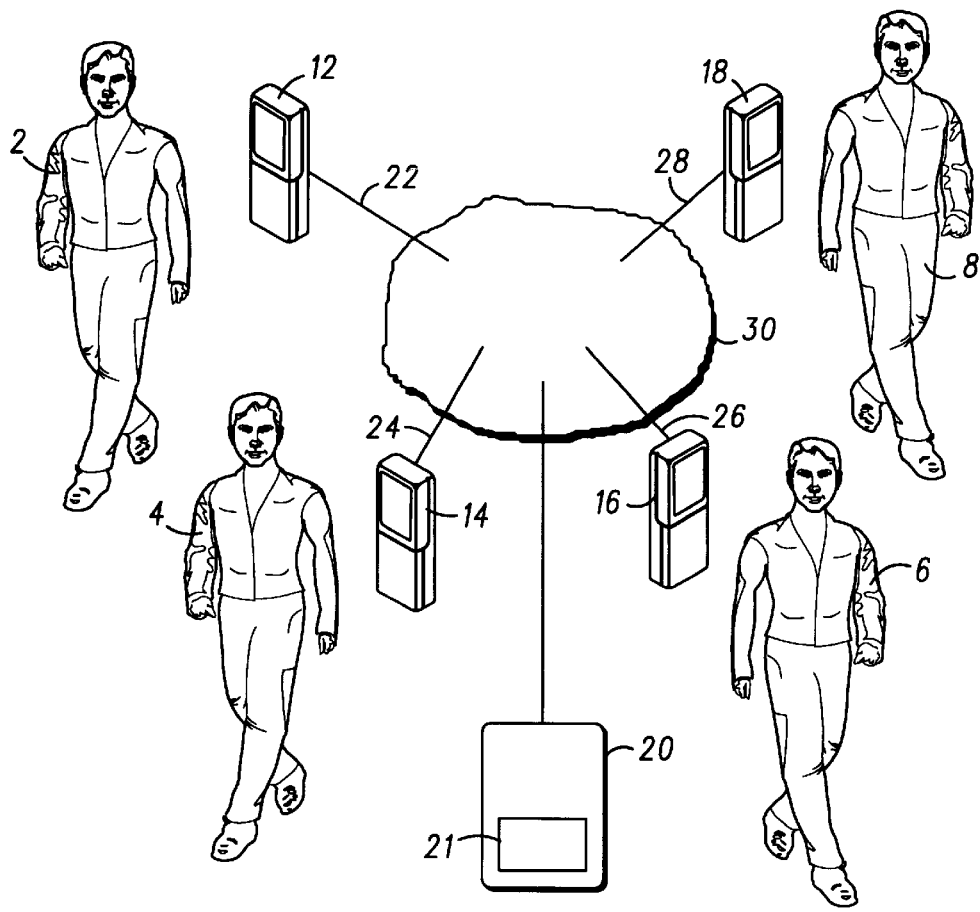
FIG. 1 shows part of a communication system in which the present invention may be embodied.

FIG. 1 shows part of a communication system in which the present invention may be embodied. Users 2, 4, 6 and 8 are employing respective communication units 12, 14, 16 and 18 to participate in a conference call. The connections for the conference call comprise respective communication links 22, 24, 26, 28 from the communication units 12, 14, 16, 18 to a public switched telephone network (PSTN) 30. In addition, a conference call control module 20 is also connected to the PSTN 30, and in operation sets up and controls participation in the conference call.

The above arrangement corresponds to a conventional conference call arrangement, and may be implemented in any conventional manner. Also, any standard modifications, alternative layouts, etc. may be incorporated.

However, in this embodiment the conference call control module 20 and communication units 12, 14, 16, 18 are modified to implement improved conference call operation, in particular to determine which user is speaking and to identify this, and other information, to the other users, as will be described in more detail below. In this embodiment the communication units 12, 14, 16, 18 are so modified by re-programming of their main processors, (alternatively modification may be by using volatile memories or running applications), and the conference call control module 20 is so modified by inclusion of apparatus, namely a caller identification module 21, incorporated therein.

More generally, apparatus for implementing the procedures to be described below may be provided by adapting conventional apparatus and/or providing additional modules. The apparatus may be in the form of hardware, firmware, or software, or a combination of these. The apparatus may comprise one or more processors, for implementing instructions and using data stored in a storage medium such as a computer disk or PROM. The apparatus may be distributed between a number of communication system components or units. The apparatus may be located with general conference call controlling apparatus or separate therefrom.

Although in this embodiment each of the communication units 12, 14, 16, 18 are telephones, alternatively or additionally any suitable communication unit may be employed, for example mobile telephone, land mobile radio handset, personal computer, etc. In this case the communication links are of suitable type, e.g. radio link plus cellular radio system infrastructure links in the case of a mobile telephone.

In summary, the caller identification module 21 identifies which user is speaking. The way the speaker recognition may be performed is described in further detail below. Then, based on this identification, this information about the identified speaker is displayed on the communication units of the other users.

Such data about the speaker may come either from a listener database forming part of the caller identification module 21, or be provided by the speaker himself or even by a third party. Thus, a real-time tracking of the speakers on each communication unit may be provided.

Optionally, the information to be displayed may be in a scalable or hierarchical form. Then, the caller identification module 21 determines the display capability of each of the communication units 12, 14, 16, 18 and provides an amount of data, in order of the scaleable or hierarchical arrangement, to each communication unit that is commensurate with the display capability of the respective communication unit.

Thus, for example, consider that user 2 is identified as the speaker, and his information consists of: hierarchical level 1—his name; hierarchical level 2—the organisation he is representing; level 3—his photograph; and level 4—his organisation's logo.

Further consider that a display screen of communication unit 14 is relatively large, that of communication unit 16 is mid-size, and that of communication unit 18 is small. Then, for example, communication unit 14 may be provided with and display all four levels of data, i.e. name, organisation, photograph and logo; communication unit 16 may be provided with and display just the top two levels of data, i.e. name and organisation; and communication unit 18 may be provided with and display just the top level of data, i.e. the speaker's name.

Figure 2:
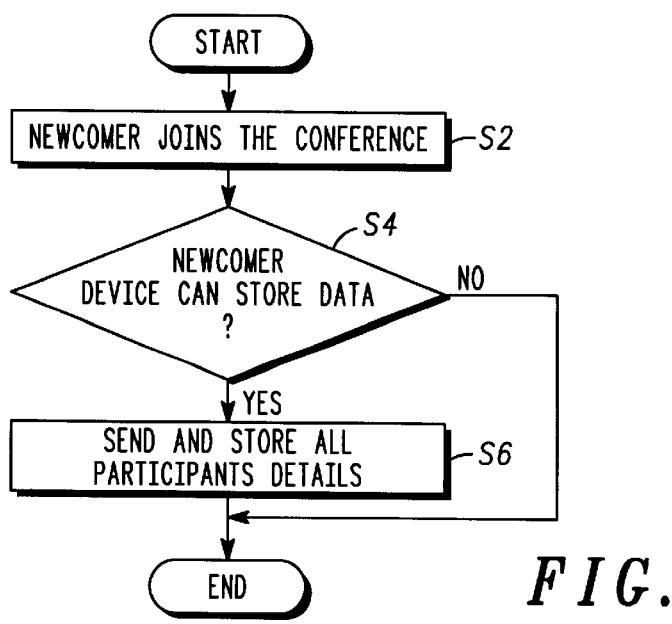
FIG. 2 is a flowchart showing process steps performed to determine the type of communication unit and/or the display capability for each communication unit involved in a conference call.

The following registration process, summarised in flowchart form in FIG. 2, may be carried out in order to determine the type of communication unit and/or the display capability for each communication unit involved in the conference call.

At step s2, a user, e.g. user 6, new to the conference call, wants to join the conference, and so registers to the conference call control module 20 (which is serving as a conference steering application), using communication unit 16. Communication unit 16 sends a description of its technical capabilities/functions to the caller identification module 21 of the conference call control module 20. In particular the information describes the display screen capability (as described above), and whether the communication unit 16 is able to store other user data. If it is not, then the registration process is completed.

However, if the communication unit is able to store other user data, then the process moves to step s6 where the caller identification module 21 sends other user data to the communication unit 16. The other user data comprises the data that is to be displayed for each of the other users in the conference call when that speaker is identified as a current speaker. Moreover, since in this example the optional hierarchical feature is employed, this information will be sent to the level of detail commensurate with the display capability of communication unit 16.

Thus, in this example, the name and organisation of each of users 2, 4 and 8 is sent to the communication unit 16, which stores this data. The data for each other user is sent, and stored, referenced to a user ID allocated to individual users by the caller identification module 21. In this example this is only done for users engaged in the conference call, and details are erased after the end of the call. However, in other embodiments a communication unit may store a number of user IDs for users regularly called, with corresponding data, such that these may be used as required over the course of different conference calls over time.

Figure 3:
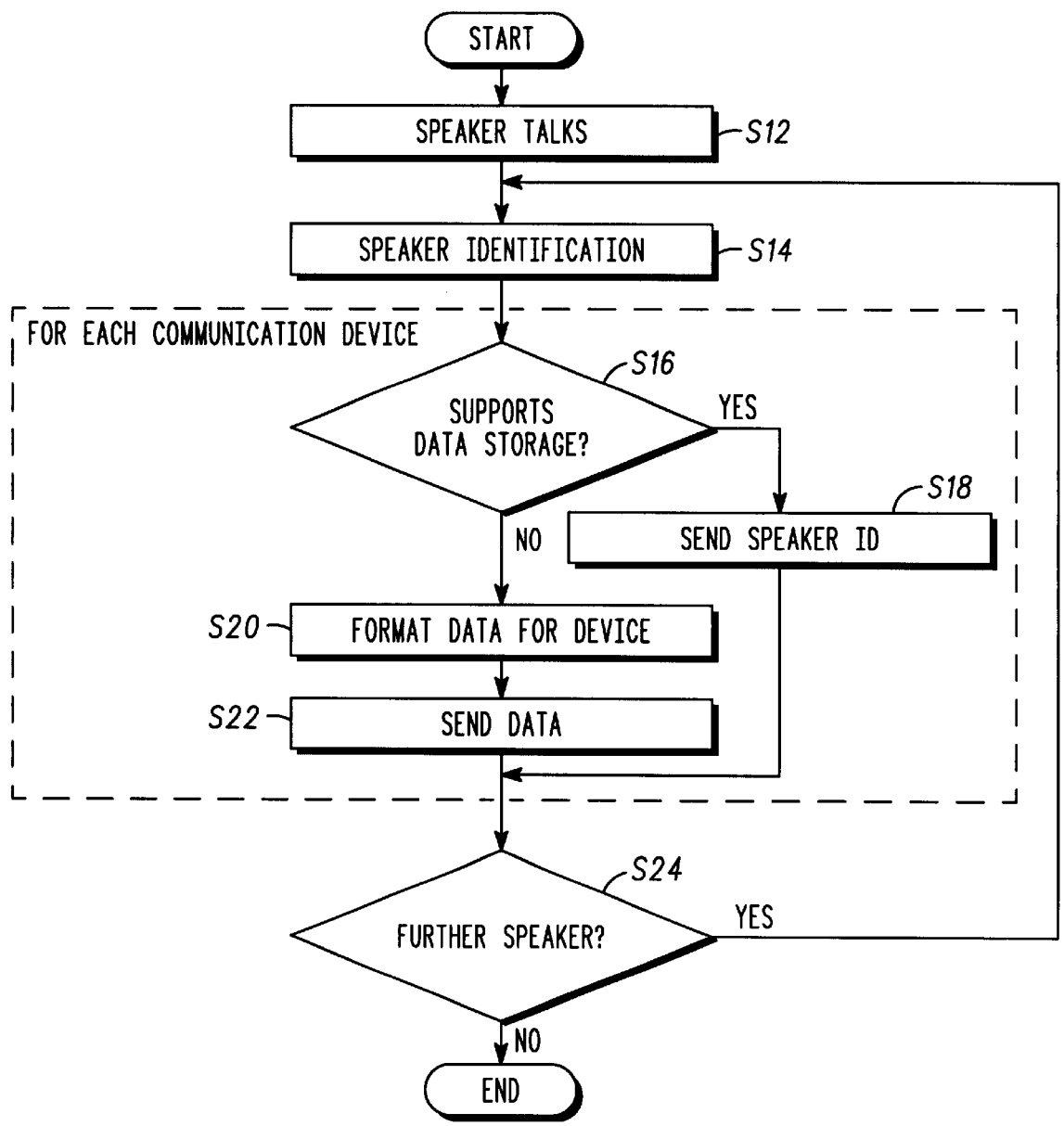
FIG. 3 is a flowchart showing process steps employed for identifying speakers and transmitting data in an embodiment of the invention.

FIG. 3 shows process steps employed for identifying speakers and transmitting data in this embodiment. At step s12 one of the users speaks.

At s14 the caller identification module determines which user is speaking. In this embodiment this is performed by the caller identification module 21 comparing the current speech of the user with speech profiles it holds for each of the users involved in the conference call. The speech profiles may be previously acquired by and stored at the caller identification module in any suitable manner.

In this embodiment each of the users, on registration, have, in addition to the steps shown in FIG. 2, also entered a standard portion of speech which the caller identification module 21 has analysed to provide that user's speech profile.

Another exemplary possibility is for data defining the speech profile of a user to be stored in that user's communication unit, and sent to the caller identification module 21 as another additional part of the above described registration process.

Another possibility is that speech profiles may be determined and stored at a separate module or database, referenced against unique user IDs, and the caller identification module 21 retrieves the speech profiles as required when it ascertains the ID of a user joining the conference call.

The caller identification module 21 compares the user's speech with the various speech profiles of the users involved in the conference call. This may be performed in any conventional manner, using for example the techniques disclosed in WO-9944380 and/or WO-9900719, the contents of each of which are included herein by reference. When a match is found, the caller identification module has successfully recognised and identified the speaker.

Once the caller identification module 21 has identified the speaker, then in steps s16–s22, it transmits data related to the identified speaker to each of the other user's communication units. For each such recipient communication unit, the following steps are carried out. At step s16, the caller identification module 21 determines whether the respective communication unit supports the above described data storage. If it does, then at step s18 the caller identification module 21 simply sends the user ID of the speaker to the communication unit, which then cross-references the user ID to its stored other user data in order to determine the speaker-related data to be displayed.

If, however, the respective recipient communication unit does not support the above described data storage, then at step s20 the caller identification module 21 formats the speaker-related data in a form appropriate for the respective recipient communication unit. At step s22 the caller identification module 21 sends that data to the recipient communication unit.

(Steps s16–s22 are repeated for each recipient communication unit, i.e. for each user in the conference call apart from the speaker. Optionally, the data can even be sent to the speaker, for verification purpose and/or in the event that a log is being recorded and stores at the communication unit of all the speakers identified, e.g. for transcript or other purpose).

When the identified speaker stops talking, at step s24, the caller identification module 21 determines whether there is a new speaker. If so, then the process is returned to step s14 and repeated for the new speaker. If there is no further speaker, then the process is completed.

In a further embodiment, a user may optionally add his own input to the data that is to be displayed for each speaker. For example, user 8 may enter into his communication unit 18 the additional data that user 2 is from a rival organisation whereas user 4 is from an organisation that is in partnership with his own organisation.

Generally, in all the above embodiments, the data to be displayed may be in any form of words, pictures, symbols etc. as required.

In the above embodiments the speaker is identified by comparing the speech input with speech profiles. Other means for identifying the speaker may be employed. For example, the telephone number of the speaker may be identified, although this has a disadvantage that only one speaker per communication unit may be accommodated, whereas the above embodiments may accommodate more than one user per communication unit.

In further embodiments, the users may be represented by autonomous entities that own data about them (the voice profile, the information details, the device capabilities, etc.).

Software agents are well suited for this task, and can be used by the user to ask to join a conference. The agent can then contact one of the agents already in the conference, or possibly organise the conference itself if it does not exist.

Some agents representing initiator participants may create a "conference agent" whose role is to manage the conference and to register newcomers. The newcomers can send their details to this agent that will then integrate them in the above processes.

Suitable types of software agents are described in the Applicant's co-pending patent application GB0020981.7, filed Aug. 25, 2000, Applicant's reference CE00315UM, the contents of which are hereby incorporated by reference.

It will be understood that the above described embodiments tend to provide the following advantages:

(i) it is possible to track the identity of a speaker involved a conference call, in real-time, without human intervention and to display an output on other participants' devices;

(ii) the output provides data about the speaker that are relevant to the listener;

(iii) the output can be picture, text or even multimedia; and (iv) the device capability and the bandwidth it uses are optimised since the data sent to each device are formatted precisely for the device.

Thus, an improved way of conducting conference calls has been provided that at least alleviates some of the aforementioned disadvantages associated with prior art arrangements.

What is claimed is:

1. A method of conducting a conference call, comprising:
identifying a user of a first communication unit speaking during the conference call;
transmitting data related to the identified speaker to other communication units being used by other users participating in the conference call; and
at least one of the other communication units receiving the data related to the identified speaker and displaying speaker data based on the received data related to the identified speaker, the displayed speaker data comprising information locally allocated to the particular speaker by user of the at least communication unit.

2. A method according to claim 1, wherein the identified speaker is identified by comparing the speech being spoken by the user with a voice profile for that user.

3. A method according to claim 2, wherein the voice profile is determined during the conference call.

4. A method according to claim 2, wherein the voice profile is determined and stored in advance of the conference call.

5. A method according to claim 4, wherein the displayed speaker data comprises information provided by the speaker.

6. A method according to claim 1, wherein for each respective other user communication unit, the data related to the identified speaker comprises data selected from a hierarchy of data relating to the identified speaker according to a data displaying capability of respective other user's communication unit.

7. A method according to claim 6, wherein the users are represented by autonomous entities that own data about the respective users.

8. A method according to claim 7, wherein software agents are employed.

9. A communication system for carrying out a conference call, comprising:
means for identifying a user of a first communication unit speaking during the conference call;
means for transmitting data related to the identified speaker to other communication units being used by other users participating in the conference call; and
means for at least one of the communication units to receive the data related to the identified speaker and to display speaker data based on the received data related to the identified speaker; and
means for locally allocating information to the identified speaker by a user of the at least one communication unit and for including the information in the displayed speaker data.

10. A system according to claim 9, wherein the identified speaker is identified by comparing the speech being spoken by the user with a voice profile for that user.

11. A system according to claim 10, wherein the voice profile is determined during the conference call.

12. A system according to claim 10, wherein the voice profile is determined and stored in advance of the conference call.

13. A system according to claim 12, wherein the displayed speaker data comprises information provided by the speaker.

* * * * *